A. VANDERVELD.
AUTOMATIC STOP MECHANISM FOR POWER DRIVEN MACHINES.
APPLICATION FILED JAN. 29, 1913.

1,080,870.

Patented Dec. 9, 1913.

6 SHEETS—SHEET 1.

WITNESSES:

INVENTOR.
Anthony Vanderveld
BY
Frank E. Liverance, Jr.
ATTORNEY.

A. VANDERVELD.
AUTOMATIC STOP MECHANISM FOR POWER DRIVEN MACHINES.
APPLICATION FILED JAN. 29, 1913.

1,080,870.

Patented Dec. 9, 1913.
6 SHEETS—SHEET 2.

WITNESSES:

INVENTOR
Anthony Vanderveld
BY
Frank E. Liverance Jr.
ATTORNEY

A. VANDERVELD.
AUTOMATIC STOP MECHANISM FOR POWER DRIVEN MACHINES.
APPLICATION FILED JAN. 29, 1913.
1,080,870.
Patented Dec. 9, 1913.
6 SHEETS—SHEET 3.
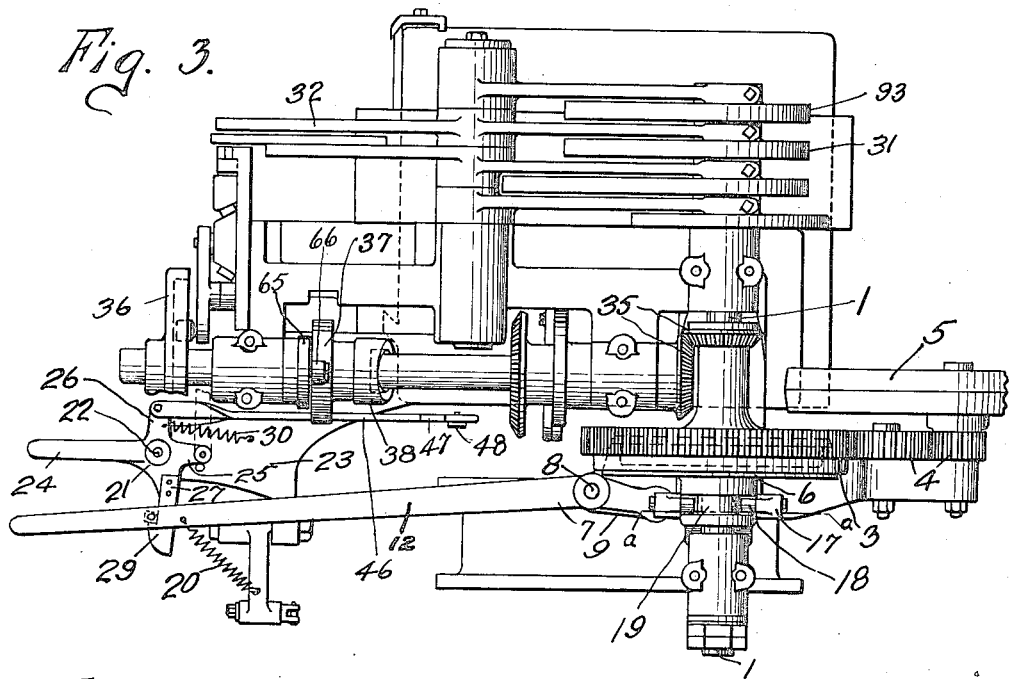
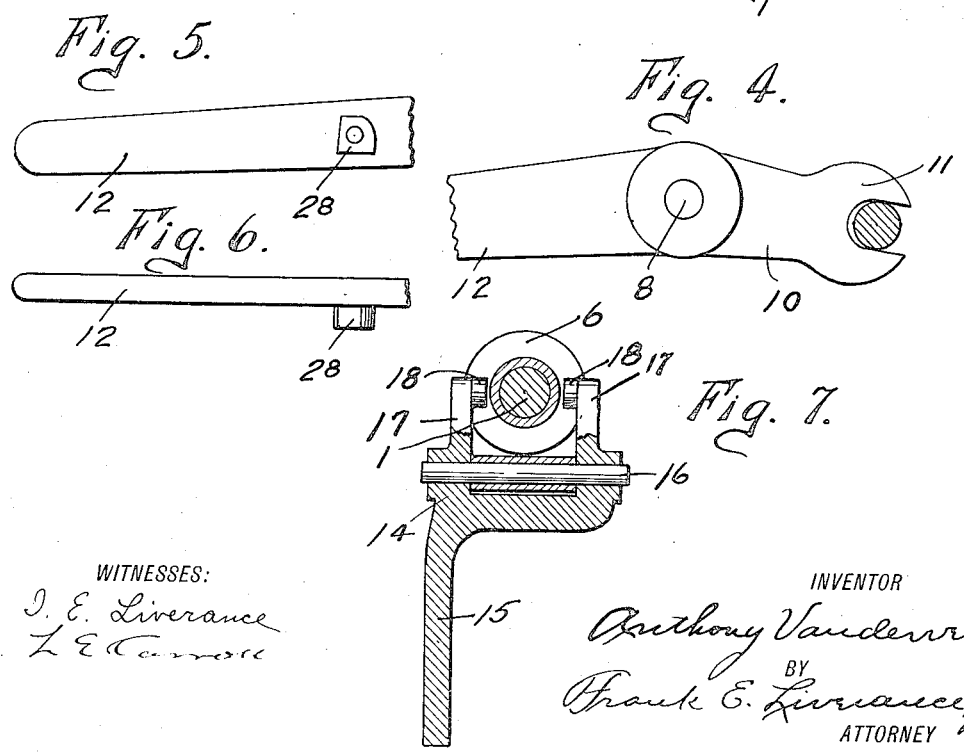
WITNESSES:
J. E. Liverance
INVENTOR
Anthony Vanderveld
BY
Frank E. Liverance, Jr.
ATTORNEY A. VANDERVELD.
AUTOMATIC STOP MECHANISM FOR POWER DRIVEN MACHINES.
APPLICATION FILED JAN. 29, 1913.
1,080,870.
Patented Dec. 9, 1913.
6 SHEETS—SHEET 4.
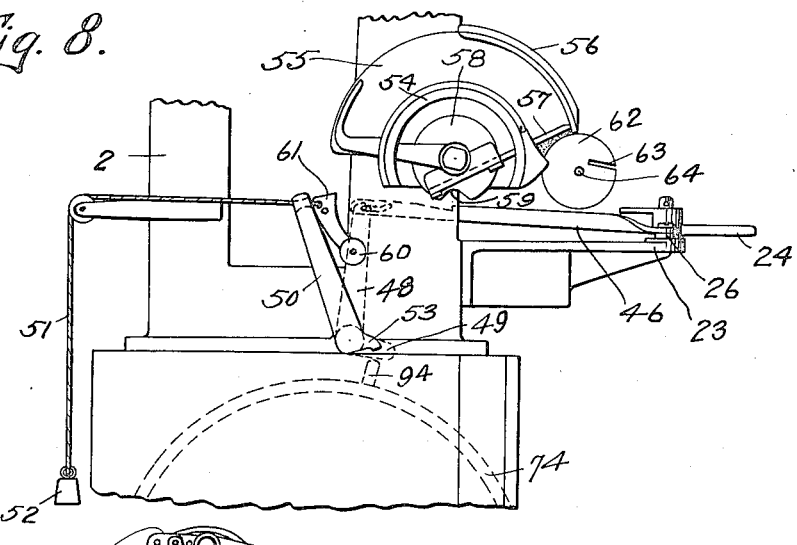
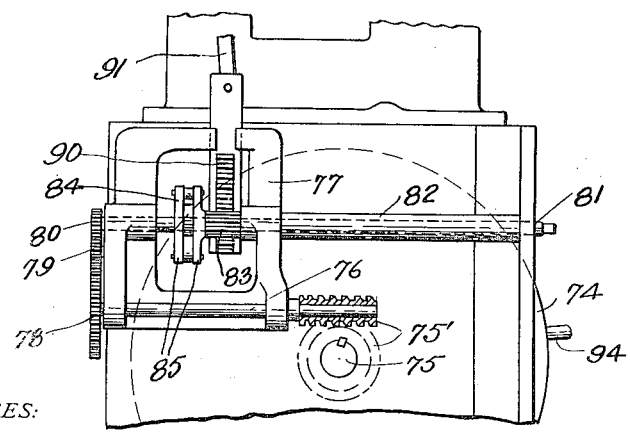
WITNESSES:
INVENTOR.
Anthony Vanderveld
BY
Frank E. Liverance, Jr.
ATTORNEY.

A. VANDERVELD.
AUTOMATIC STOP MECHANISM FOR POWER DRIVEN MACHINES.
APPLICATION FILED JAN. 29, 1913.
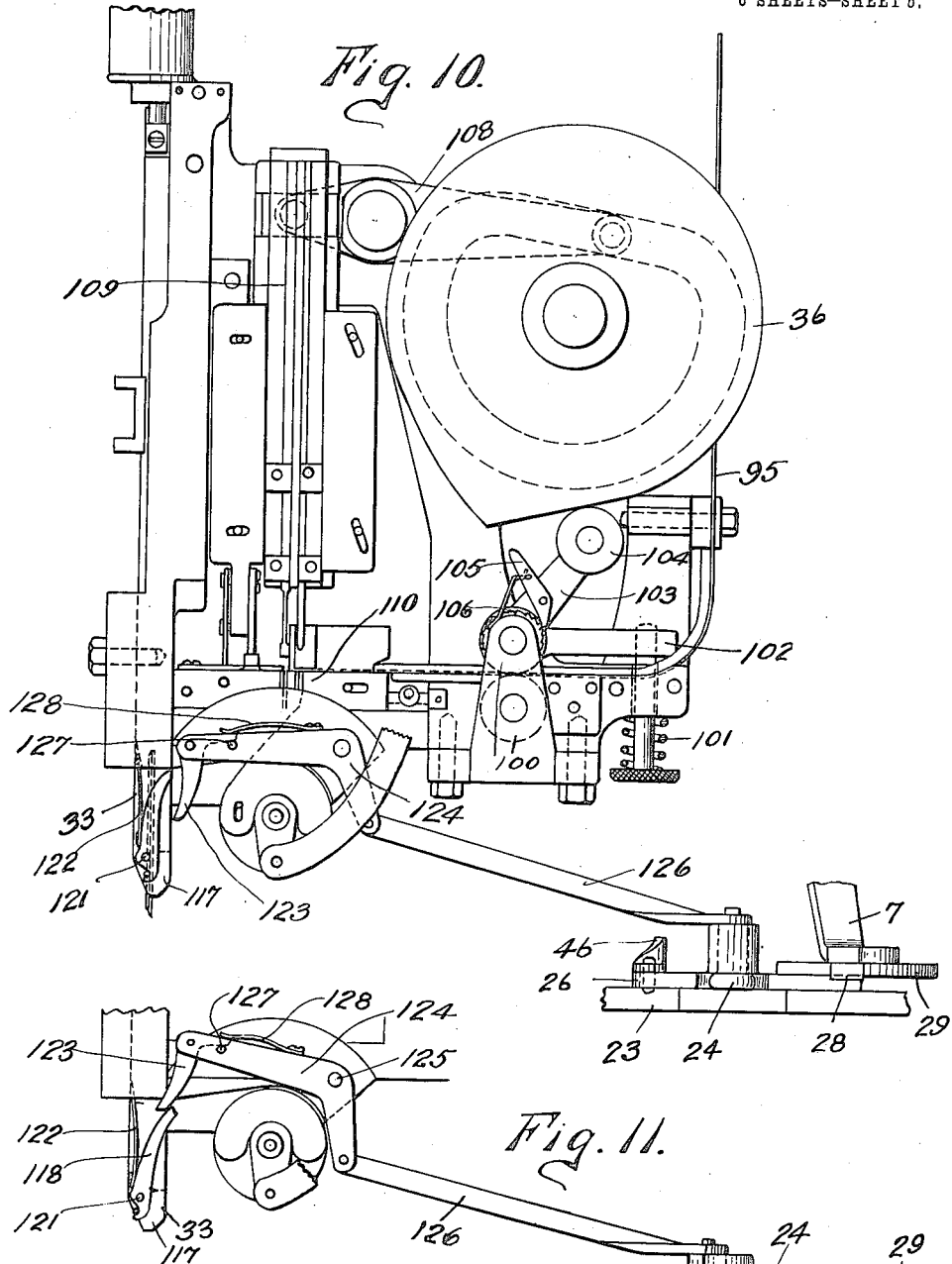

A. VANDERVELD.
AUTOMATIC STOP MECHANISM FOR POWER DRIVEN MACHINES.
APPLICATION FILED JAN. 29, 1913.
1,080,870.
Patented Dec. 9, 1913.
6 SHEETS—SHEET 6.
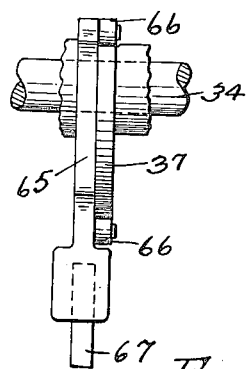
Fig. 12.
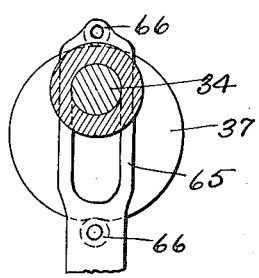
Fig. 13.
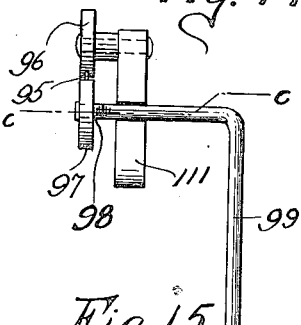
Fig. 14.
Fig. 15.
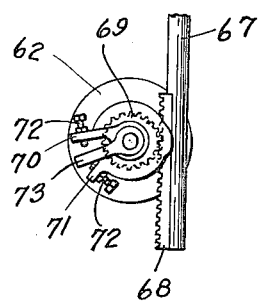
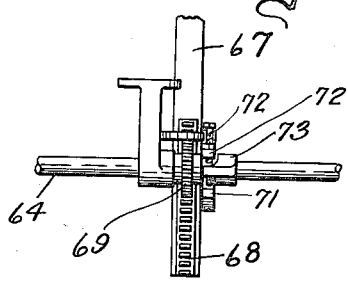
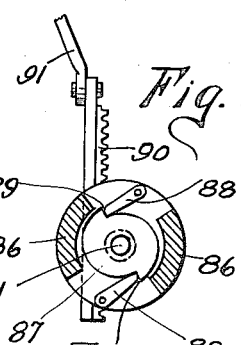
Fig. 16.
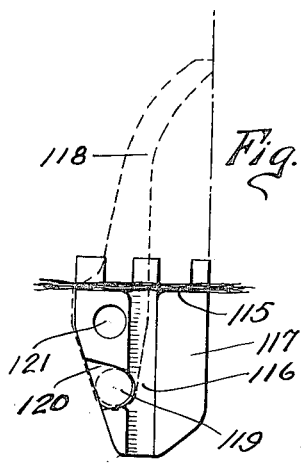
Fig. 17.
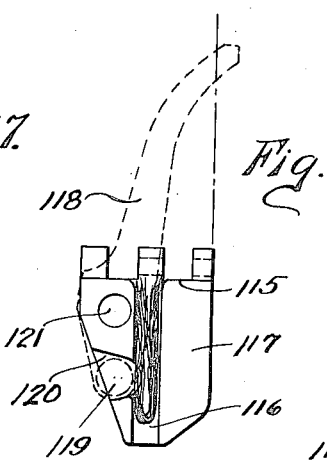
Fig. 18.
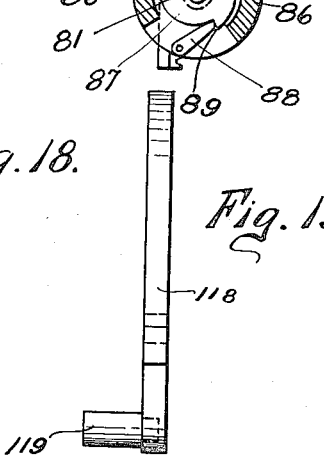
Fig. 19.
WITNESSES:
J. E. Liverance
L. E. Carrow
INVENTOR.
Anthony Vanderveld.
BY
Frank E. Liverance, Jr.
ATTORNEY.

UNITED STATES PATENT OFFICE.

ANTHONY VANDERVELD, OF GRAND RAPIDS, MICHIGAN.

AUTOMATIC STOP MECHANISM FOR POWER-DRIVEN MACHINES.

1,080,870.

Specification of Letters Patent.

Patented Dec. 9, 1913.

Application filed January 29, 1913. Serial No. 745,036.

*To all whom it may concern:*

Be it known that I, ANTHONY VANDERVELD, a citizen of the United States, and resident of Grand Rapids, in the county of Kent and State of Michigan, have invented a certain new and Improved Automatic Stop Mechanism for Power-Driven Machines, of which the following, taken in connection with the accompanying drawings, is a specification.

In the operation of so-called automatic machines which are used in the manufacture of articles of merchandise, it is evident that at times it is desirable to stop the machine before any further operation thereof in making the article takes place. Such stops are desirable and in fact necessary if there is any fault in the material used such that the article when made will be defective; or if there is an insufficient supply of material from which the article is made; and also when the article is completed.

Figure 1:
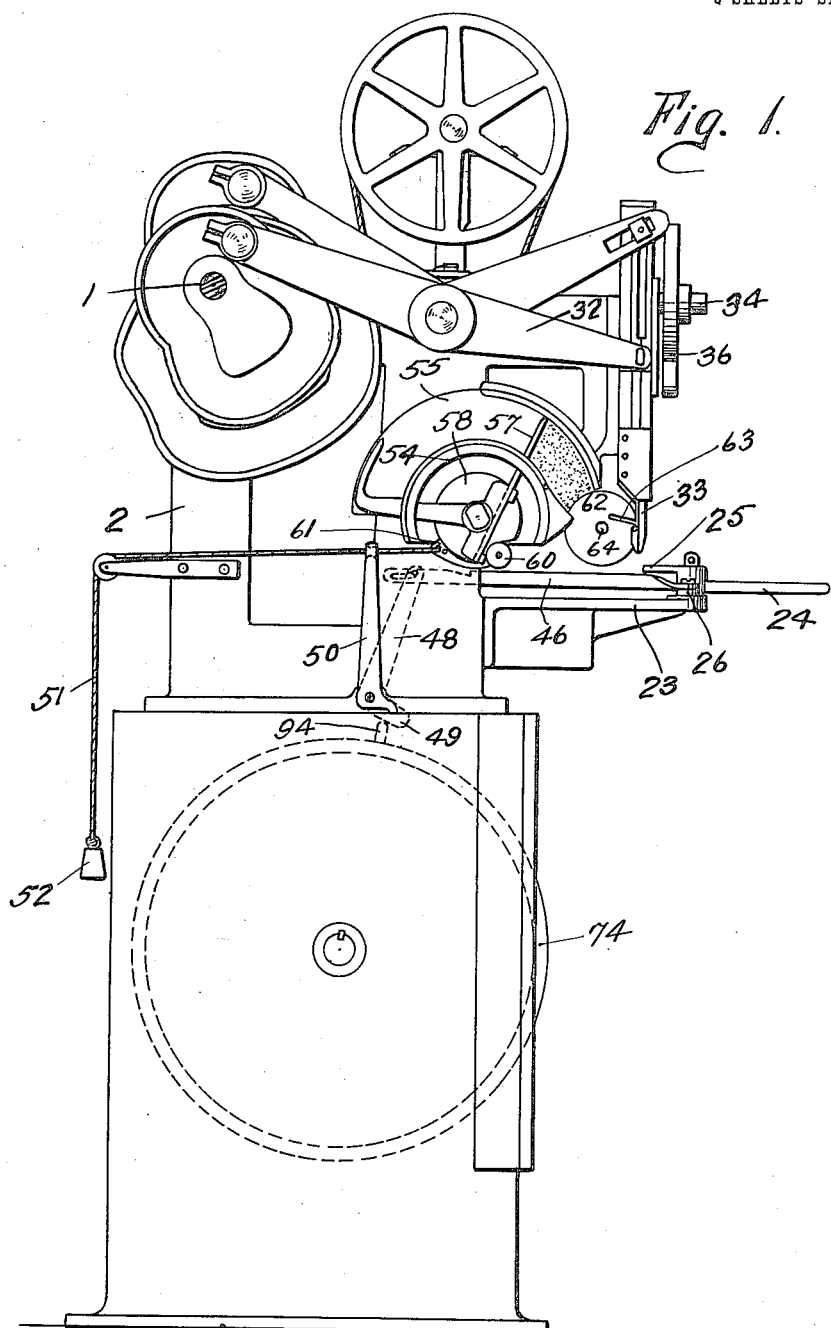
Figure 2:
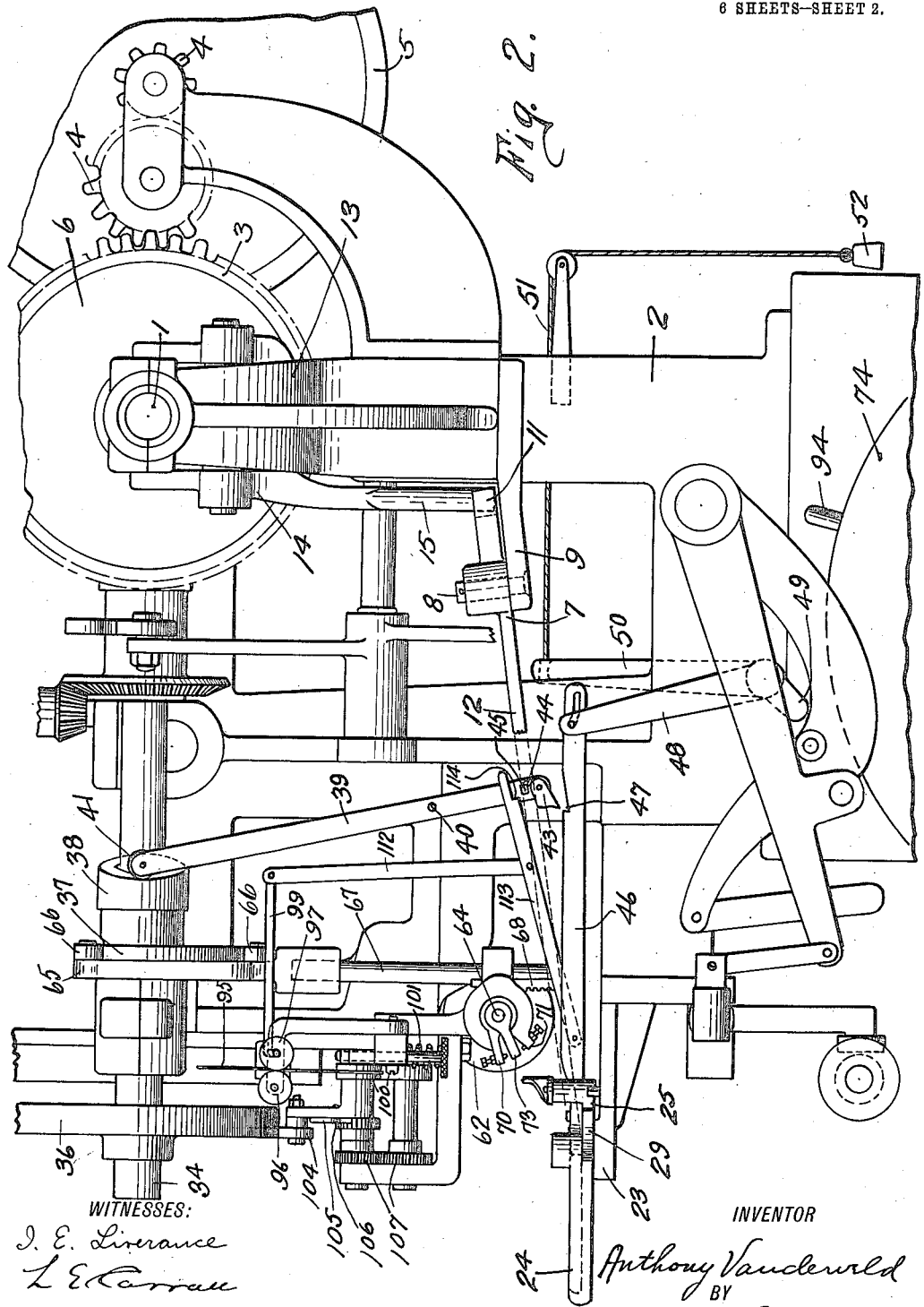

The invention disclosed in this application is of particular utility with respect to brush machines and it accomplishes all of these desired results in the course of making a brush, that is, it will automatically stop if the supply of bristle, or of wire from which the bristle fastening means is made, or if a blank in which the bristle is inserted is not supplied in proper position and condition for use; also if the wire used falls below a certain size such that it would be too small for effective use in fastening the bristle in place; or if a tuft of bristle for any reason is not fastened in the brush blank during the operation of the machine; and finally when the brush is completed and is ready to be taken from the machine to make place for a succeeding brush blank. The construction by which these functions are made possible is fully shown in the accompanying drawings and in which, Figure 1 is a side elevation of the brush machine showing the general arrangement of the principal elements of the machine which are concerned in this invention. Fig. 2 is a side elevation from the side opposite that shown in Fig. 1, of the upper part of the machine. Fig. 3 is a plan view of the machine and of the major portion of the automatic stop mechanism. Fig. 4 is a plan view of one end of the starting lever. Fig. 5 is a view from beneath and Fig. 6 a side view of the opposite end of the starting lever. Fig. 7 is a sectional view, taken on the line *a—a*, Fig. 3. Fig. 8 is a fragmentary side view of the machine from the same side as in Fig. 1, indicating the action of the parts when the bristle supply is nearly exhausted. Fig. 9 shows the means by which the drum is actuated to bring its projecting member into engagement with stop mechanism to position it in place to stop the machine. Fig. 10 is a front view of a part of the upper portion of the machine and showing the connection between the stop mechanism and the bristle tuft carrier and guide. Fig. 11 is a similar view of the operation of the device when a bristle tuft is not inserted in the blank. Figs. 12 and 13 are side and front views, respectively, of the mechanism for operating the bristle feed wheel. Fig. 14 is a plan view of a detail of the wire guiding means. Fig. 15 is a section on line *c—c*, Fig. 14. Fig. 16 is a section taken vertically through the drum actuating means. Figs. 17 and 18 are side views of the lower portion of the bristle guide, with a covering plate removed to show the interior thereof, the dotted lines indicating two positions of the lever 118 in two different stages of the bristle inserting. Fig. 19 is an edge view of the lever 118 and the lateral pin carried thereby.

Similar reference numerals refer to similar parts throughout the several views.

In the embodiment shown as illustrating my invention, the drive shaft 1 supported by the frame 2, carries a gear wheel 3 loosely thereon which through gears 4 is connected with the belt wheel 5 by means of which power is supplied to the machine from any engine or other source of power. A drive clutch 6 is slidably mounted on the drive shaft 1 but is keyed so as to turn therewith, and this clutch has frictional engagement with the gear 3 at one limit of its slidable movement on shaft 1 but being adapted to be disengaged therefrom when moved in the opposite direction. It will be clear that when the clutch is thus engaged, and the belt wheel actuated, the drive shaft 1, and all parts connected therewith will be set in motion, and that a disengagement of the clutch will disconnect the power thereby allowing the shaft and parts to stop. As a means of controlling the movements of the clutch, the starting lever 7 is provided, pivoted at 8 to a ledge 9 situated some distance below the clutch, said lever comprising a relatively short arm 10 having a bifurcated end 11, and a relatively long arm 12 extending toward the front of the machine and in position to be readily engaged and manipulated by the hand of the operative of the machine. Pivotally mounted on the arm 13 of the frame of the machine is a clutch operating member 14 which, as shown in Fig. 7 comprises a depending arm 15 below the pivot 16 of the member 14, and two upwardly extending arms 17 each carrying a roller 18 which enter a groove 19 in the clutch member 6. The lower end of arm 15 is situated between the ends formed by the bifurcation of arm 10. When the starting lever is actuated about its pivot, the movement of arm 10 serves to actuate the clutch operating member to slide the clutch on the shaft 1 as will be apparent. A movement of the arm 12 away from the machine serves to disengage the clutch and allow the gear wheel 3 to run loosely while movement toward the machine causes an engagement of the clutch and wheel thereby operating the machine.

Normally the starting lever 7 is drawn so as to disengage the clutch member from wheel 3. This is accomplished by the tension spring 20. In order to hold the clutch in driving position, the lever 21 is provided, mounted pivotally at 22 on a supporting platform 23 near the front of the machine. Lever 21 has a handle 24 extending in a forward direction, two arms 25 and 26, one extending opposite to the handle and the other at substantially right angles thereto, and a hooked extension 27 opposite to arm 26. The long arm 12 of the starting lever carries on its under side a projecting stud 28 which is adapted to be engaged by the hook 29 of the hooked extension thereby holding the starting lever in position to operate the clutch into engagement with the gear wheel 3, and cause the continuous operation of the shaft 1. A spring 30 attached to arm 26 and platform 23 serves to normally draw the hook securely against the stud so that accidental disengagement is precluded. The end of hook 29 is rounded thereby making it easy for the stud to ride into place without any manual manipulation of the handle 24 being necessary.

The drive shaft 1 carries a number of cams of which only one may be noted in connection with this invention. This cam 31 operates arm 32 to raise and lower the bristle carrier and guide 33. A counter shaft 34 is positioned at right angles to drive shaft 1 and is driven thereby through the beveled gears 35. The counter shaft has located along its length, a number of cams 36, 37 and 38 which, respectively, are of use to operate the punch mechanism by which fasteners are made from a continuous strip of wire, the feed wheel which feeds bristles in proper quantities to the bristle guide, and the lever 39 an operative part of the automatic stop mechanism. Said lever is pivoted at 40 to the frame of the machine and at its upper end it carries a roller 41 which bears against the cam 38. Any convenient means may be provided to hold the roller 41 against the cam 38. At its lower end lever 39 is provided with a forwardly projecting and pivotally attached lug 43, which is held from dropping below a certain position by the projection 44 thereof engaging lug 45 placed immediately above lug 43. Lug 45 has other functions as will hereinafter appear.

As the counter shaft 34 revolves, the cam 38 imparts motion to the lever 39 oscillating it about its pivot, and causing the continuous back and forth movement of lug 43. Attached to the end of arm 26 of lever 21 is a link 46 which extends rearwardly and is positioned just beneath the lug 43, normally, as it swings back and forth. A notch 47 is cut in the upper edge of link 46 and is adapted to be engaged by the lug 43 if the link is raised high enough so that the lug will not clear. At its rear end link 46 is provided with a slot through which a pin carried at the upper end of lever 48 is inserted, supporting the link in substantially a horizontal plane. The slot extends from its rear end forward in a horizontal direction for a short distance and then inclines upwardly at an angle, and it is in this forward upwardly inclined end that the pin is normally seated, supporting the link just beneath lug 43 as it swings back and forth. If, however, for any reason, the pin is moved to or toward the rear end of the slot, the link is thereby elevated, and lug 43 engages notch 47, and on its forward oscillatory movement, carries the link with it, turning lever 21 about its pivot, thereby disengaging hook 29 from lug 28 on the starting lever, and freeing such lever to the influence of spring 20 by which the lever is drawn outwardly to disengage the clutch 6 and disconnect the power from the machine.

The lever 48 is in the nature of a bell crank lever, pivoted to the frame of the machine and having an upwardly extending arm that supports the link 46, and a downwardly and forwardly projecting short arm 49, the function of which will later appear. On the opposite side of the frame of the machine and connected to lever 48 to move therewith, is another upwardly extending arm 50, having at its upper end an opening through which passes the weight cord 51, which has a weight 52 connected to the end of the cord, the other end of the cord being operatively connected to the bristle receptacle of the machine in such manner as to force the bristles therein forward to the feed end of the receptacle. The lower end of arm 50 is provided with a member 53 which contacting with the frame of the machine prohibits the forward movement of arm 50 and the attached lever 48 beyond a certain limit, as best shown in Fig. 1.

The bristle receptacle comprises a curved bottom or base member 54, side members 55, one being removed in Figs. 1 and 8 to better show the structure, and a top 56 over a part only of the receptacle, the forward end of the receptacle being open to discharge the bristles. Pivotally mounted below the base is a follower 57 which extends through slots in the base to near the top member of the receptacle, the follower being positioned behind the bristles in the receptacle. The pivotal mount of the follower consists of a roller 58 to which the follower is attached which roller is mounted on a journal for turning. At one point in the periphery of the roller, a notch 59 is cut and it is shaped to receive the small roller 60 carried on the end of member 61, to the other end of which the weight cord 51 is attached. It will be clear that the weight 52 exerts its influence to turn roller 58 in a clockwise direction, and presses the follower 57 firmly against the bristle in the bristle receptacle, urging it forward to the open feed end of the receptacle.

Opposite the open feed end of the receptacle is a feed wheel 62 having a slot 63 extending from the outer edge of the wheel into the body thereof, said slot receiving bristles from the bristle receptacle. The feed wheel is mounted on a shaft 64 and is connected to the counter shaft in such manner that it is rotated a half a revolution and then back again at each cycle of the machine. This is accomplished by means of the construction shown best in Figs. 12 and 13. A link 65 surrounds the counter shaft 34 and carries spaced apart rollers 66 which have engagement with the cam 37, whereby rotation of the counter shaft and cam 37 causes the link to travel back and forth in a vertical direction. A rod 67 provided with a rack 68 is securely attached to the link and moves therewith, and the rack is in mesh with a pinion 69 loosely mounted on the shaft 64, whereby the reciprocatory movement of the rack gives the pinion a back and forth revolving movement. Secured to the pinion are the arms 70 and 71 spaced apart and carrying adjustable screws 72. An arm 73 is secured to the shaft 64 and extends between the arms 70 and 71. By adjusting the screws as desired, the rotary movement of shaft 64 and the feed wheel attached thereto may be controlled exactly as to extent, the screws alternately engaging arm 73 and in such manner turning the shaft.

As the feed wheel is turned so that its slot comes opposite the feed opening of the bristle receptacle, bristles are forced therein, and on the return of the wheel, they are delivered to the bristle carrier and guide 33. As the process continues, the bristles in the receptacle become less in quantity, and the follower 47 travels farther forward. At the same time the roller 58 to which the follower is attached is turned about its axis, and the notch 59 therein travels to the rear. When the bristle is nearly exhausted, the notch will have reached a point such that the roller 60 normally located therein, will be pulled out of the notch and it with its carrying member 61 will be drawn back against the arm 50, as shown in Fig. 8, this causing the weight 52 to act on arm 50 and its connected lever 48, thereby elevating the link 46 into position to be engaged by the lug 43 of the oscillating lever 39, stopping the machine at once after the roller 60 disengages from notch 59. In this manner, when the supply of bristle becomes low, notice thereof is given by the automatic stopping of the machine. Upon replenishing the supply, the roller 60 may be replaced, and the machine again operated until the supply again becomes low. The advantage of this automatic stop is obvious.

There is also provided a means for automatically stopping the machine upon completion of a predetermined cycle of operations of the machine as, for instance, after a brush has been completed. To this end there is provided a drum 74 mounted for rotation on a shaft 75 extending through the frame of the machine the shaft carrying a worm wheel at one end and on the side of the machine opposite the drum. The worm wheel is indicated by broken lines in Fig. 9 and is in mesh with a worm 75' secured to a shaft 76 having mounting in a frame 77 attached to the side of the machine. At its opposite end shaft 76 is provided with a spur gear 78 connected by idle pinion 79 with another spur gear 80 secured to one end of shaft 81 and which also is mounted in frame 77 extending therebeyond through a sleeve 82 to the front of the machine and having a squared end for the reception of a crank by means of which the shaft can be manually turned. Loosely mounted on shaft 81 is a pinion 83 which has attached thereto either integrally or by suitable securing means, the pawl carrying member 84, comprising two spaced apart disks 85 which have integrally cast connecting parts 86, leaving, however, a space between the disks in which the ratchet disk 87 securely attached to shaft 81 may turn, and also for the mounting of the two pawls 88 secured between the disks and at opposite edges thereof. These pawls have engagement with the ratchet member or disk 87 and are adapted to engage shoulders 89 thereof as shown in Fig. 16 when the pinion 83 is rotated in one direction but which will ride over the edges of the disk 87 when the pinion is rotated in the opposite direction. A rack 90 meshes with pinion 83 and has reciprocatory movement in a vertical direction through the rod 91 leading to and attached to arm 92 which arm is controlled and given movement by the cam 93 mounted for rotation on shaft 1. From this construction it will be clear that with the rotation of the drive shaft 1, the drum will be given an intermittent step rotation through the action of the pawls engaging the ratchet disk and during one movement of the rack 90 turning the shaft 81 and the mechanism connected thereto while upon return movement the pawls will ride over the disk and impart no motion thereto. Projecting from the surface of the drum is a peg 94 which is so positioned that it will upon sufficient rotation of the drum come directly beneath and engage with the part 49 integral with arm 48. When this occurs the arm 48 is thrown backward elevating link 46 into position for engagement of lug 43 with notch 47 in the link upon which the machine will be stopped as previously described. Before the machine is started the drum may be rotated manually through crank connection with shaft 81 to the position desired such that after the completion of a certain number of cycles of the machine, the peg 94 will come to its operative position to stop the machine.

In the manufacture of brushes by the machine it is necessary in fixing tufts of bristle in place to have a fastening means and in my machine such means is made by the machine from wire in a continuous strip. The wire 95 is led between rollers 96 and 97, the former of which is secured rigidly in place and has a groove cut therein for passage of the wire while the other is mounted for rotation on the end of the offset portion 98 of the rod 99. Farther on the wire passes between rollers 100 which are mounted one above the other and the pressure of such rollers on the wire is regulated by spring 101 drawing arm 102 on which the upper roller is mounted downward. A periodical step rotation of the rollers is given through the arm 103 carrying roller 104 which bears against cam 36 said arm carrying pawl 105 which has engagement with a ratchet 106 secured to a sleeve also secured to the upper roller. As the cam 36 rotates, it rocks arm 103 and thereby through the pawl 105 rotates the ratchet and the upper roller through a certain arc, while through the operation of gears 107 as shown in Fig. 2, the lower roller 100 is rotated in a direction opposite to the upper roller thereby carrying wire 95 between them a short distance. The cam 36 also serves to operate the arm 108 which has attachment to the punch member 109. Upon the downward stroke of the punch member 109, the punches carried thereby pass into properly shaped dies 110 and cut the wire into suitable fasteners for the bristle tufts. The structure just described is not any part of my present invention but the operation thereof is given to show the operative connection with that part of the machine which does constitute a part of my invention.

If for any reason, the wire should break, or become exhausted, or fall below a certain size, there would be either no fasteners furnished or such as were furnished would be too small and weak for effective use. The presence of any of these conditions will cause the automatic stopping of the machine in the following manner, and by reason of the following structure. Rod 99 passes over and is pivotally mounted in support 111, extends laterally a short distance and is then bent and extended in a backward direction having attachment at its rear end to the upper end of a link 112 the lower end of which is attached to link 113 which link is pivoted to link 46 at its front end and which passes backwardly above the lug 45 carried by lever 39. A notch 114 is cut in the under side of link 113 at its rear end and in normal position with wire of the requisite size passing between the rollers 96 and 97, the oscillation of lever 39 carries lug 45 under the link 113 and out of engagement therewith. It will be noted, however, that with the rod 99 offset downwardly as at 98, the weight of the parts 99, 112 and 113 will serve to always press the roller 97 against the wire, and that if the wire reduces in size or ceases to pass between parts 96 and 97 part 97 will be thrown forward, the rear end of rod 99 dropping, and in this manner lowering link 113 so that upon oscillation of the lever 39 lug 45 will engage in the notch 114 pushing link 113 and its attached link 46 forward thereby releasing the starting lever as previously described and disconnecting the power from the machine. As the lever arm of the roller 97 is very short in comparison with the length backward of the rod 99, it is evident that a very slight forward movement of the roller 97 will cause a considerable drop of the link 113, and that a very small decrease in the size of the wire will serve to cause the stopping of the machine.

In the operation of fastening the tufts of bristle in the brush blank, the bristles are fed from the feed wheel into the guide 33 and lie across it in the position shown in Fig. 17 that is above the shoulder 115 and thereagainst. This shoulder is inside the guide, a plate being removed from the guide in Figs. 17 and 18 to show the interior structure. The vertical passageway 116 leads to the bottom of the element 117 of the guide 33 and through this passage the bristle tufts are adapted to be forced doubling into a loop as shown in Fig. 18 in position to be inserted into a hole in a brush blank. Mounted on the side of the guide 33 is a lever 118 which has a laterally extending pin 119 passing through the guide and seating in a recess in the side thereof said recess indicated by 120 extending into the vertical passageway 116 so that in normal position of the pin 119 it lies partly in the passageway as shown in dotted outline in Fig. 17. The lever 118 is pivoted at 121 and a spring 122 serves to hold the lever in upright position with the pin 119 seated in the recess 120, the upper end of the lever coming just within the edge of the guide 33. As a tuft of bristle is doubled and forced through the passageway for a distance, it bears against the side of pin 119 forcing it toward the side of the guide 33 and turning lever 118 about its pivot thereby throwing the upper end inwardly beyond the opposite side of the guide and in position to contact with the pawl 123 carried on the end of a bell crank lever 124 which is pivotally mounted at 125 the other arm of the bell crank lever having connection through a link 126 with an upwardly projecting boss integral with arm 25 of lever 21. The pawl 123 pivoted to the end of one arm of the bell crank lever 124 is stopped in its pivotal movement in one direction by a pin 127 and is held normally in engagement with such pin by the flat spring 128 which however is yieldable to allow the pawl to have movement in the opposite direction. The pawl is so positioned in relation to the guide 33 that its lower end is just to one side thereof and will just clear the upper end of the lever 118 when it is in normal position without any bristles in the passageway 116. But when bristles are in said passageway the pawls will come in contact as the guide 33 is operated up and down by the arm 32 and cam 31. On the downward movement of the guide the spring 128 will yield and allow pawl 123 to turn sufficiently to permit the lever 118 to pass. If the bristle is inserted in the brush blank in proper manner, the bristle will pass out of the passageway 116 and the lever 118 will return to normal position and on the upward movement of the guide will clear the pawl 123 and the operation can be repeated. The machine is designed to work in this manner and in the absence of abnormal conditions will so work. If, however, for any reason, the bristle is not discharged from the passageway, lever 118 will be held out of its normal position as shown in Figs. 11 and 18, and on the return of the guide will engage under the end of pawl 123, which contacting with pin 127 elevates the bell crank arm and operates the link 126 lengthwise in this manner turning lever 21 and freeing the starting lever 7 whereby the power is disconnected and the machine brought to a stop. By this means I provide for the automatic stopping of the machine when there is danger of a defective article being made as would be the case if a bristle was skipped at any period in the manufacture of a brush and the machine continued to set other bristles in place.

I have fully described the construction and operation of a practically operative means for automatically stopping power driven machines at various necessary stages of its operation and one found thoroughly efficient and practical in actual operation. The invention is capable of various embodiments, however, and the disclosure made is to be taken as diagrammatic and illustrative of the invention and not in any sense as limiting to any certain specific construction. The invention itself comprehends all modifications falling properly within the scope of the appended claims.

What I claim as new and desire to secure by Letters Patent is:—

1. In a power driven machine, starting means operatively connected therewith whereby in one position thereof power may be supplied to operate the machine and in another position the power will be disconnected from the machine, means normally holding the starting means in power disconnected position, means to hold the starting means in power supplying position, a reciprocating member driven by the machine said means carrying an element adapted to lie in two different positions and means connected to the holding means and positioned to be engaged by said element in one of its positions and be operated thereby to disengage the holding means from the starting means.

2. In a power driven machine, starting means operatively connected therewith whereby in one position thereof power may be supplied to operate the machine and in another position the power will be disconnected from the machine, means to hold the starting means in power supplying position, a member driven by the machine and having movement back and forth between two extreme positions, and means connected to the holding means and lying in proximity to the member and adapted to be engaged to be actuated by the member thereby operating the holding means to disengage it from the starting means.

3. In a power driven machine, starting means operatively connected therewith whereby in one position thereof power may be supplied to operate the machine and in another position the power will be disconnected from the machine, means to hold the starting means in power supplying position, a member driven by the machine and having reciprocating movement, means connected to the holding means and normally lying in close proximity to but out of engagement with the reciprocating member, and means whereby the reciprocating member may actuate the means connected to the holding means to thereby effect the disengagement of the holding means and the starting means.

4. In a power driven machine, starting means operatively connected therewith whereby in one position thereof power may be supplied to operate the machine and in another position the power will be disconnected from the machine means to hold the starting means in power supplying position, a member driven by the machine and having back and forth movement between two extreme positions, a pawl pivotally connected to said member and normally lying within the planes of the sides of said member, means connected to the holding means and lying adjacent to the side of the reciprocatory member whereby if the pawl is moved out of normal position, it will engage with said means.

5. In a power driven machine, starting means operatively connected therewith whereby in one position thereof power may be supplied to operate the machine and in another position the power will be disconnected from the machine, means to hold the starting means in power supplying position, a member having a central passage therein said member connected to the machine and having reciprocatory movement, a pawl connected pivotally to the reciprocating member and having an element extending into the central passage, means connected to the holding means and positioned adjacent the reciprocatory member whereby when any material is passed through the central passage the pawl will be pivotally turned to engage with said connecting means.

6. In a power driven machine, starting means operatively connected therewith whereby in one position thereof power may be supplied to operate the machine and in another position the power will be disconnected from the machine, means to hold the starting means in power supplying position, a member mounted for reciprocatory movement on the machine and operated by the power driving the machine, said member having a central passageway therein through which material used by the machine has passage, a pawl connected pivotally to the reciprocating member and having an element extending into the central passageway, a bell-crank lever pivoted adjacent the path of the reciprocating member, a link connecting said bell crank lever and the holding means, whereby the holding means is automatically released upon engagement of the pawl with the bell-crank lever, said engagement being caused by material in the passageway operating the pawl outward so as to turn the bell-crank lever about its pivot during a portion of the movement of the reciprocating member, substantially as described.

In testimony whereof, I have hereunto affixed my signature in the presence of two witnesses.

ANTHONY VANDERVELD.

Witnesses:
   FRANK E. LIVERANCE, Jr.,
   L. E. CARROLL.